United States Patent
Bloch et al.

(10) Patent No.: US 7,809,796 B1
(45) Date of Patent: Oct. 5, 2010

(54) METHOD OF CONTROLLING ACCESS TO NETWORK RESOURCES USING INFORMATION IN ELECTRONIC MAIL MESSAGES

(75) Inventors: Eric Bloch, San Mateo, CA (US); Robert Van Zant, San Bruno, CA (US); Scot Kennedy, San Francisco, CA (US)

(73) Assignee: IronPort Systems, Inc., San Bruno, CA (US)

( * ) Notice: Subject to any disclaimer, the term of this patent is extended or adjusted under 35 U.S.C. 154(b) by 852 days.

(21) Appl. No.: 11/696,851

(22) Filed: Apr. 5, 2007

Related U.S. Application Data (60) Provisional application No. 60/789,969, filed on Apr. 5, 2006.

(51) Int. Cl.
*G06F 15/16* (2006.01)
*G06F 15/173* (2006.01)

(52) U.S. Cl. .................. 709/206; 709/224; 709/225; 709/229

(58) Field of Classification Search ......... 709/204–206, 709/223–226, 229; 726/1–3
See application file for complete search history.

(56) References Cited

U.S. PATENT DOCUMENTS

| | | | |
|---|---|---|---|
| 7,421,498 B2* | 9/2008 | Packer | 709/225 |
| 2006/0168066 A1* | 7/2006 | Helsper et al. | 709/206 |
| 2006/0253584 A1* | 11/2006 | Dixon et al. | 709/225 |
| 2007/0043815 A1* | 2/2007 | Tsang et al. | 709/206 |
| 2007/0136806 A1* | 6/2007 | Berman | 726/22 |
| 2008/0082662 A1* | 4/2008 | Dandliker et al. | 709/225 |

* cited by examiner

*Primary Examiner*—Nathan Flynn
*Assistant Examiner*—Joshua Joo
(74) *Attorney, Agent, or Firm*—Hickman Palermo Truong & Becker LLP

(57) ABSTRACT

A method and apparatus for controlling access to network resources referenced in electronic mail messages comprises the computer-implemented steps of receiving an electronic mail message that comprises one or more hyperlinks; determining sender information that identifies a sender of the electronic mail message; creating and storing a record that associates the sender information with each of the one or more hyperlinks; receiving a request to access a specified hyperlink among the one or more hyperlinks; retrieving, based on the specified hyperlink, the record; retrieving, based on the sender information associated with the specified hyperlink, sender reputation information associated with the sender; determining, based on the sender reputation information, a particular action among a plurality of allowed actions; and issuing a network request to access the specified hyperlink only when the particular action is allowing user access to the specified hyperlink.

21 Claims, 7 Drawing Sheets

METHOD OF CONTROLLING ACCESS TO NETWORK RESOURCES USING INFORMATION IN ELECTRONIC MAIL MESSAGES

PRIORITY CLAIM

This application claims the benefit under 35 U.S.C. 119(e) of prior provisional application 60/789,969, filed Apr. 5, 2006, the entire contents of which are hereby incorporated by reference for all purposes as if fully set forth herein.

FIELD OF THE INVENTION

The present invention generally relates to network data communications. The invention relates more specifically to techniques for controlling access to potentially harmful server resources, such as Web sites that implement "phishing" attacks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Some network resources such as Web sites are configured by malicious or dishonest persons to host harmful computer program code, or to contain forms or applications that seek to collect personal identifying information or financial account information for unauthorized purposes. The persons who control such sites often seek to entrap unsuspecting users into giving up personal financial information by sending electronic mail (e-mail) messages to the users that appear to originate from legitimate entities, and contain hyperlinks to the malicious or dishonest sites. Network security analysts use the term "phishing" to describe such approaches.

Other e-mail senders dispatch to enterprise end users messages containing hyperlinks to Web sites or other network resources that the end users are not allowed to access according to enterprise policy. Such sites may include pornographic material, streaming audio or video content that consumes excessive enterprise network bandwidth, or other material for which the enterprise prefers to control access. The messages may be unsolicited, but need not be.

Hypertext transfer protocol (HTTP) and simple mail transfer protocol (SMTP) are defined in Internet Engineering Task Force (IETF) Request for Comments (RFC) 2616 and RFC 2821. The reader of this document is presumed to be familiar with RFC 2616, RFC 2821, and the structure of an HTTP request, a URL, a hyperlink, and an HTTP proxy. Generally, an HTTP request is an electronic message that conforms to HTTP and that is sent from a client or server to another server to request a particular electronic document, application, or other server resource. An HTTP request comprises a request line, one or more optional headers, and an optional body. A URL identifies a particular electronic document, application or other server resource and may be encapsulated in an HTTP request. A hyperlink is a representation, in an electronic document such as an HTML document, of a URL. Selecting a hyperlink invokes an HTTP element at a client and causes the client to send an HTTP request containing the URL represented in the hyperlink to an HTTP server at, and identified by, a domain portion of the URL.

In conventional operation of hypertext transfer protocol (HTTP), electronic documents prepared using hypertext markup language (HTML) may contain hyperlinks to other documents or network resources. A user views the HTML documents using a browser, such as Firefox, Netscape Navigator, or Microsoft Internet Explorer. When a user selects a hyperlink for a network resource in an HTML document, the browser issues an HTTP GET or POST request to the HTTP server that hosts the linked resource. Before dispatching the request, the browser places the uniform resource locator (URL) of the current HTML document in a "Referer" header in an HTTP request. The receiving HTTP server can use the Referer value to learn how the user reached the HTTP server. If the browser is configured to send HTTP requests to an HTTP proxy server rather than directly to the server that hosts the linked resource, then the HTTP proxy server can examine the contents of the Referer field to determine whether the user should be allowed to obtain the requested network resource.

A browser may display objects other than HTML documents. Browsers may request URLs for reasons other than in response to a user selecting a hyperlink in an HTML document. A browser does not always need to be explicitly configured to communicate with a proxy; some proxies can be configured transparently.

However, when a hyperlink or URL appears in an e-mail message, which a user has received legitimately or as part of a phishing attack, selecting the hyperlink does not result in placing information in the Referer field. Because the hyperlink or URL is in an e-mail message, which is not an HTML document or Web site, no URL identifying the e-mail message can be formed and placed in the Referer field. As a result, in current practice there is no way to control access to hyperlinks or URLs that appear in an e-mail based on the origin of that e-mail. Consequently, e-mail systems are vulnerable to phishing attacks and other problems.

Email messages that are displayed by browsers in so-called "webmail" clients present a special case of the foregoing general description. In a webmail client, an email message is displayed as part of an HTML document or HTML fragment. When the user selects a hyperlink in a webmail client, the browser sends a referer header, but the browser does not include information from the sender about the sender of the email. Instead, the browser typically places in the referer header a URL that is derived from the implementation of the webmail client.

Based on the foregoing, there is a clear need in the data processing field for a method that permits controlling access to Web sites and other network resources that are referenced within e-mail messages using URLs or hyperlinks.

More generally, electronic mail (email) messages often contain URLs that are presented to users in email client software. When a user clicks on a URL that is displayed in the email client, the email client typically communicates the URL to the user's preferred web browser and the web browser initiates an HTTP request for the URL and renders the resulting response. It is quite common for email from unknown, disreputable sources to contain URLs that point to web sites that attempt to harm end user computers using spyware, adware, malware downloads or other techniques. There is a need for a technique that a network security device, devices, or software systems can use to prevent or control access to such URLs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for controlling access to network resources referenced in electronic mail messages are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
2.1 Modified Hyperlink Approach
2.2 Sender Reputation Approach
3.0 Implementation Mechanisms—Hardware Overview
4.0 Extensions and Alternatives 1.0 General Overview The needs identified in the foregoing Background, and other needs and objects that will become apparent for the following description, are achieved in the present invention, which comprises, in one aspect, a method comprising the computer-implemented steps of: receiving an electronic mail message that comprises one or more hyperlinks; determining sender information that identifies a sender of the electronic mail message; creating and storing a record that associates the sender information with each of the one or more hyperlinks; receiving a request to access a specified hyperlink among the one or more hyperlinks; retrieving, based on the specified hyperlink, the record; retrieving, based on the sender information associated with the specified hyperlink, sender reputation information associated with the sender; determining, based on the sender reputation information, a particular action among a plurality of allowed actions; issuing a network request to access the specified hyperlink only when the particular action is allowing user access to the specified hyperlink.

In one feature of this aspect, the plurality of allowed actions include blocking user access to the specified hyperlink. In another feature, the record is stored in a local database in a messaging apparatus that comprises an SMTP mail transfer agent and an HTTP proxy. In yet another feature, the request to access the specified hyperlink is received at an HTTP proxy, and wherein the electronic mail message is received at an SMTP mail transfer agent that is coupled to the HTTP proxy.

In a further feature, the sender information comprises a network address of a sender of the electronic mail message. In another feature, the sender information comprises a message header "From:" value that is extracted from the electronic mail message. In yet another feature, the sender reputation information is retrieved by providing the sender information in a request to an external sender reputation database.

In other aspects, the invention encompasses other computer apparatus and a computer-readable medium configured to carry out the foregoing steps.

2.0 Structural and Functional Overview 2.1 Modified Hyperlink Approach

Figure 1:
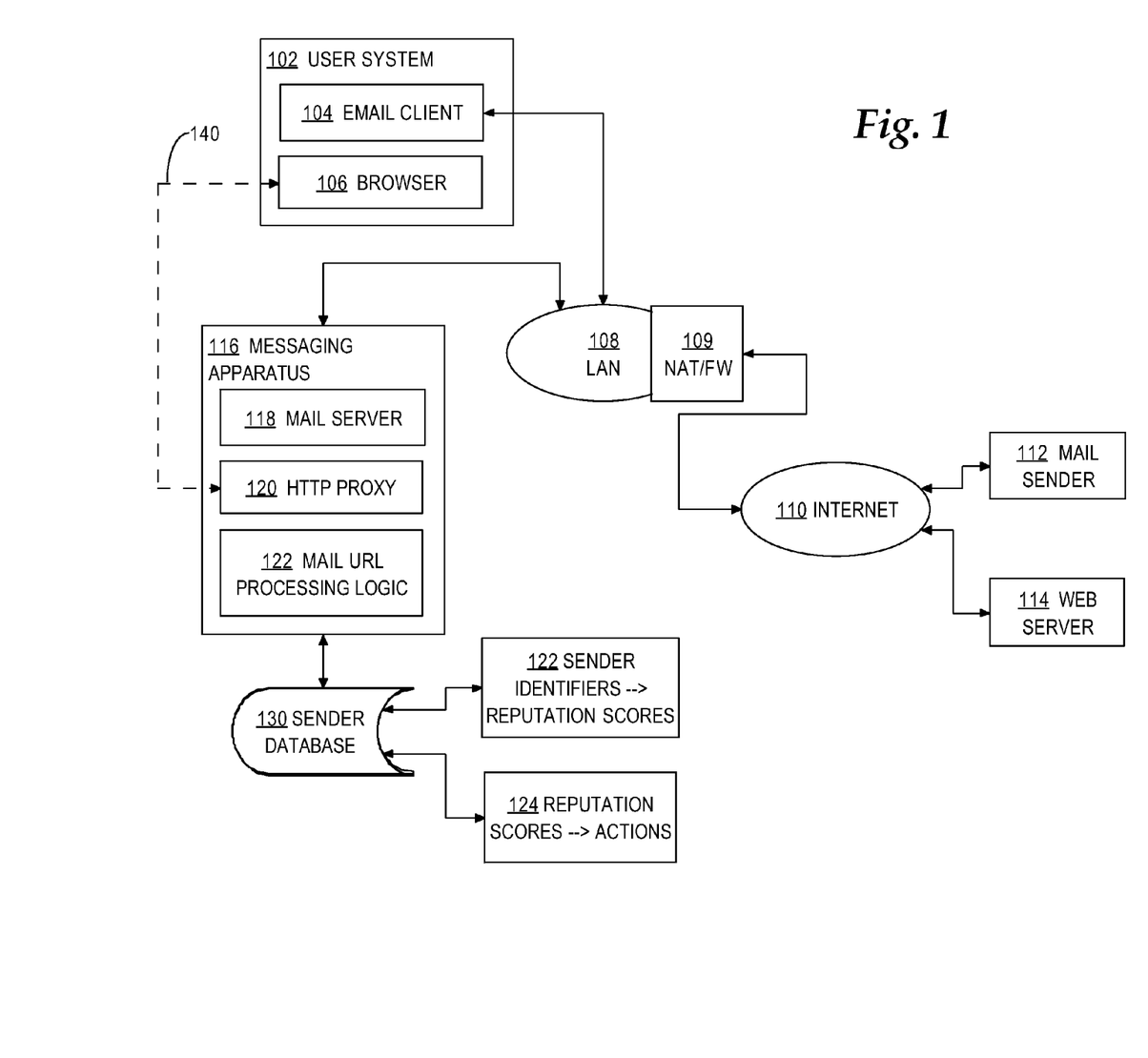
FIG. 1 is a block diagram that illustrates an example network arrangement that may be used to implement an embodiment.

FIG. 1 is a block diagram of an example network arrangement that may be used to implement an embodiment.

A user system 102 hosts an e-mail client 104 and a browser 106, and is coupled to a local area network (LAN) 108. E-mail client 104 is an HTML-enabled e-mail reading and sending program, for example, Microsoft Outlook 2003. Browser 106 can render HTML documents and communicate with network resources using HTTP. For example, browser 106 comprises Firefox, Netscape Navigator, Microsoft Internet Explorer, etc.

For purposes of illustrating a clear example, FIG. 1 illustrates LAN 108 coupled to one user system 102; however, in other embodiments any number of user systems is coupled to the LAN.

LAN 108 is coupled directly or indirectly through one or more internetworks, or Internet 110, to a mail sender 112 and a network resource such as Web server 114. Mail sender 112 generally represents any entity that sends e-mail messages directed to user system 102 or a user of the user system; the mail sender may be a legitimate end user, a legitimate bulk commercial mailing site, or a malicious party. Web server 114 holds one or more network resources such as Web sites, HTML documents, HTTP applications, etc. The Web server 114 may be owned, operated, or affiliated with mail sender 112, or may be independent.

A network address translation (NAT) or firewall device 109 may be deployed at an external edge of LAN 108 to control the flow of packets to or from the LAN.

A messaging apparatus 116 is coupled to LAN 108 and comprises in combination a mail server 118, HTTP proxy 120, and mail URL processing logic 122. In one embodiment, mail server 118 comprises a simple mail transfer protocol (SMTP) mail transfer agent that can send e-mail messages through LAN 108 to other local users and through Internet 110 to remote users, and can receive messages from the LAN or Internet and perform message-processing functions.

HTTP proxy 120 implements HTTP and can send and receive HTTP requests and responses on behalf of user system 102 and other users systems that are coupled to LAN 108. In an embodiment, the browser 106 of user system 102 is configured to use an HTTP proxy rather than sending and receiving HTTP requests and responses directly, and is configured with a network address of HTTP proxy 120, as indicated by dashed line 130. Such configuration may be an explicit configuration, or HTTP proxy 120 may be configured as a transparent proxy. Thus, when a user of system 102 selects a hyperlink referring to Web server 114 and contained in an HTML document that browser 106 is displaying, the browser generates an HTTP request directed to HTTP proxy 120 rather than to Web server 114.

Figure 2:
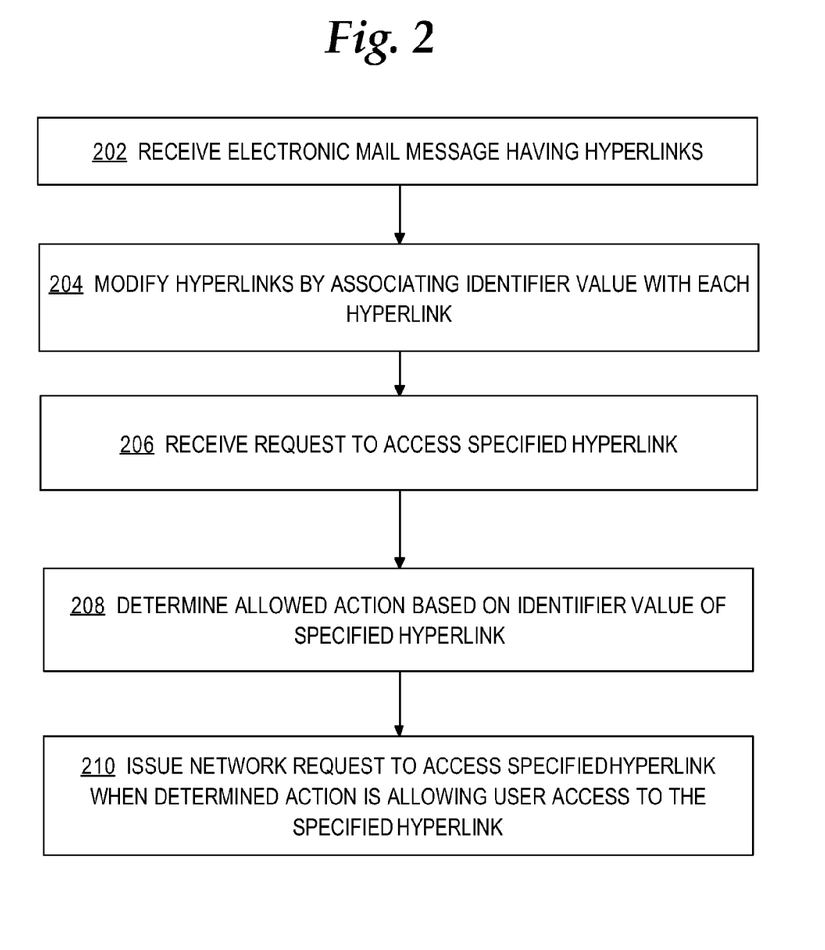
FIG. 2 is a flow diagram that illustrates a high level overview of one embodiment of a method for controlling access to network resources referenced in electronic mail messages.

Mail URL processing logic 122 comprises one or more computer programs, methods, processes, or other software elements that implement the functions that are described further herein, such as the functions of FIG. 2.

In one embodiment, messaging apparatus 116 comprises any of the IronPort Messaging Gateway Appliances that are commercially available from IronPort Systems, Inc., San Bruno, Calif., configured with application software and/or operating system software that can perform the functions described herein.

Figure 3:
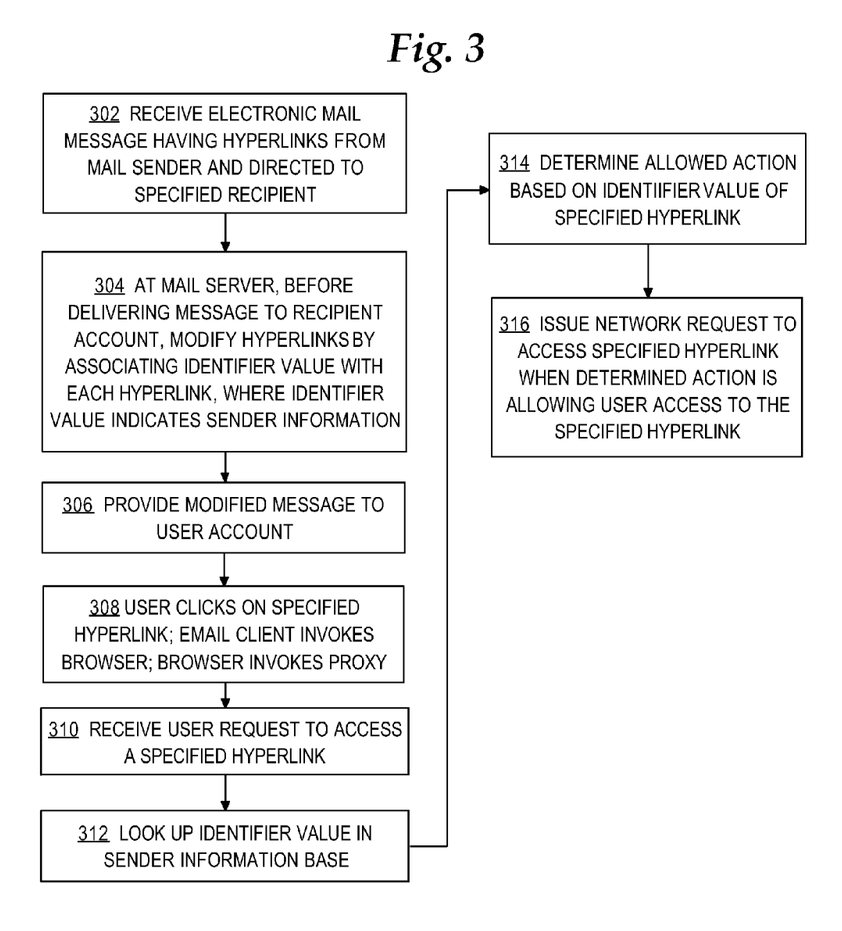
FIG. 3 is a flow diagram that illustrates a more detailed view of another embodiment of a method for controlling access to network resources referenced in electronic mail messages.

FIG. 2 is a flow diagram that illustrates a high level overview of one embodiment of a method for controlling access to network resources referenced in electronic mail messages; FIG. 3 is a flow diagram that illustrates a more detailed view of another embodiment of a method for controlling access to network resources referenced in electronic mail messages. For purposes of illustrating a clear example, FIG. 2 and FIG. 3 are now described with reference to the context of FIG. 1. However, the broad approach of FIG. 2 and FIG. 3 may be implemented in many other contexts.

In step 202, an electronic mail message having hyperlinks is received. In this description, "hyperlink" and "URL" refer to any element of a message that describes a network resource or location. For example, mail sender 112 sends a message through Internet 110 directed to a user account on mail server 118 that is associated with a user of system 102. The messaging apparatus 116 receives the message at mail server 118, which buffers the message and signals the mail URL processing logic 122 that a new message has arrived. Assume, for purposes of illustrating a clear example, that the body of the received message contains the text shown in Table 1.

TABLE 1

EXAMPLE RECEIVED MESSAGE

To provide you with the best possible service, we at Online Payment Services need you to verify your account information with us. If you do not verify your account information, then we will disable your account. To provide your account details, please click here:
http://onlinepayment.phishingscam.com Thank you!

Despite the appearance of the message, the message is not authorized by Online Payment Services, and the URL in the message (http://onlinepayment.phishingscam.com) accesses a server that collects user account data for fraudulent or malicious purposes.

At step 204, the hyperlinks in the received message are modified by associating an identifier value with each hyperlink. For example, mail URL processing logic 122 creates a copy of the received message, and in place of the original URL in the message, the following is written into the copy: http://onlinepayment.phishingscam.com/?_IronPort-URLID=1234567

In this example, "1234567" is the identifier value, which is associated with the URL by placing the identifier value in a parameter field named _IronPort-URLID. In alternate embodiments, any other field name may be used. Further, identifier values may comprise any sequence of symbols and need not comprise numeric identifiers.

The identifier value represents information about the origin of the received message containing a URL. For example, the identifier value may be a network address, such as an IP address, of a sender of the message. Alternatively, the identifier value may be a hash value produced using a one-way hash function based on the sender's network address, or based on the content of the message body, or a combination thereof. The particular process used to generate the identifier value may vary depending on what quantity or type of information is deemed useful for mail URL processing logic to determine the origins of a requested URL in a message.

The message copy, not the original message, is then released from the buffer of mail server 118 and associated with a user account of the recipient. Thus, in the approach herein, a user account never receives the originally received message, but always receives a copy of the message in which all URLs have been rewritten with associated identifiers.

In step 206, a request is received to access a specified hyperlink. For example, a user of system 102 activates email client 104, reads the received message copy, and clicks on the rewritten URL given above. In response, email client 104 invokes browser 106, for example, using an API of the browser or a dynamic linked library (DLL) associated with the browser. When invoking the browser 106, email client 104 passes a copy of the selected rewritten URL to the browser.

Because the browser 106 has been configured to use HTTP proxy 120 for accessing URLs, the browser passes the rewritten URL to the proxy and requests the proxy to access the URL on behalf of the browser. Mail URL processing logic 122 receives the rewritten URL from the HTTP proxy 106. In effect, mail URL processing logic 122 intercepts the user's invocation of a URL, which allows the mail URL processing logic to examine the URL and determine whether to permit the user to access the URL.

At step 208, based on the identifier value of the specified hyperlink, an allowed action is determined. For example, mail URL processing logic 122 obtains the identifier value associated with the URL that the user selected, and determines whether to allow the user to access the URL based on the identifier. In one embodiment, messaging apparatus 116 maintains a table or database 130 that associates message sender identifiers with allowed actions. Alternatively, messaging apparatus may maintain a first table or database 122 that associates message sender identifiers with sender reputation values, and a second table or database 124 that associates sender reputation values with allowed actions. Allowed actions may include accessing a URL, blocking access to a URL, blocking access to a URL and also issuing a warning message, allowing access to a URL conditionally (e.g., when user system 102 passes a set of security posture validation tests).

Messaging apparatus 116 may maintain the tables or databases for use with features, applications or functions other than mail URL processing logic 122. Further, the tables or database may be maintained outside messaging apparatus 116, which may access the tables or database of sender information through LAN 108 or Internet 110. As a specific example, the database 130 of sender information may comprise the SenderBase service of IronPort Systems, Inc.

In these embodiments, step 208 involves mail URL invoking a method or function call of database 130 that requests the database to return an allowed action for a particular sender identifier value.

In step 210, a network request to access a specified hyperlink is issued when the determined action is allowing user access to the specified hyperlink. For example, when mail URL processing logic determines at step 208 that the sender of the message has a good reputation, or that the user may access the requested URL, then HTTP proxy 120 issues an HTTP GET request for the requested URL. The HTTP GET request passes through LAN 108 and Internet 110 to a web server 114 associated with a domain specified in the URL, and the web server provides an HTTP response. Proxy 120 receives the HTTP response and forwards the response to browser 106, which acts upon the response. For example, the response may contain an HTML document, which browser 106 displays.

Referring now to FIG. 3, a more detailed view of the approach herein comprises receiving, at step 302, an electronic mail message having one or more hyperlinks, from a mail sender, and directed to a specified recipient. For example, mail server 118 receives an e-mail message that mail sender 112 has sent to a user account associated with a user of system 102. In step 304, at the mail server 118, before the message is delivered to a recipient account, the hyperlinks are modified by associating an identifier value with each hyperlink, where the identifier value indicates sender information. At step 306, the modified message is provided to the user account.

In step 308, after opening and displaying the received modified message, the user clicks on a particular hyperlink in the message. In an attempt to access the hyperlink and display or access a network resource associated with the hyperlink, email client 104 invokes browser 106, and the browser invokes HTTP proxy 120. The HTTP proxy 120 passes, to mail URL processing logic 122, the hyperlink specified in the browser invocation; thus, at step 310, a user request to access a specified hyperlink is received at the mail URL processing logic. In response, in step 312, the identifier value is looked up in a sender information base, such as sender database 130.

At step 314, an allowed action is determined, based on the identifier value of the specified hyperlink and information about the sender obtained from the sender information base. At step 316, if the action determined at step 314 is allowing user access to the specified hyperlink, then the mail URL processing logic 122 instructs or allows the HTTP proxy 120 to issue a network request to access the specified hyperlink The approach herein uniquely ties together SMTP mail information and HTTP information, which are normally unrelated. The approach can relate an incoming email to a corresponding HTTP request that arrives at a later time through a different server. Because the approach herein controls both an incoming mail stream and an HTTP proxy, the system can determine the origin of a message and determine whether to allow HTTP access to embedded URLs based on the origin. The incoming mail server can tag incoming URLs with a unique identifier, so that when a user clicks on a URL in an email, the HTTP proxy can extract the unique identifier and know where the URL originated.

The approach provides the messaging apparatus with a second chance to stop threats embodied in email messages.

In an alternative embodiment, when a user of user system 102 selects a URL embedded in an email, email client 104 attaches information about the mail sender 112 in the Referer field of an HTTP request. In this embodiment, email client 104 comprises logic associated with a browser interface component of the email client that can add Referer headers to URLs. Other logic at user system 102 interfaces to browser 106 to specify an HTTP request header and the URL to launch. Other logic at user system 102 can determine what sender information, such as IP address, message-id, message digest, etc., to send in the Referer header. The foregoing logic may be implemented as a plug-in or DLL to email client 104. In operation, when a user of user system 102 selects a URL within an email message that email client 104 is displaying, the logic determines the sender information associated with the message, creates an HTTP request, places the sender information in the Referer header, and sends the HTTP request. HTTP proxy 120 intercepts the HTTP request and processes it in the manner described above for the other embodiments.

The approach herein also is useful in processing URLs that specify protocols other than HTTP. For example, the approach herein is useful for URLs that specify HTTP over TLS or SSL (HTTPS://URLs) if HTTP proxy 120 (FIG. 1) is configured to terminate a TLS connection or SSL connection to web server 114. The approach herein also is useful for other protocols that can be explicitly or transparently proxied.

2.2 Sender Reputation Approach

Figure 5:
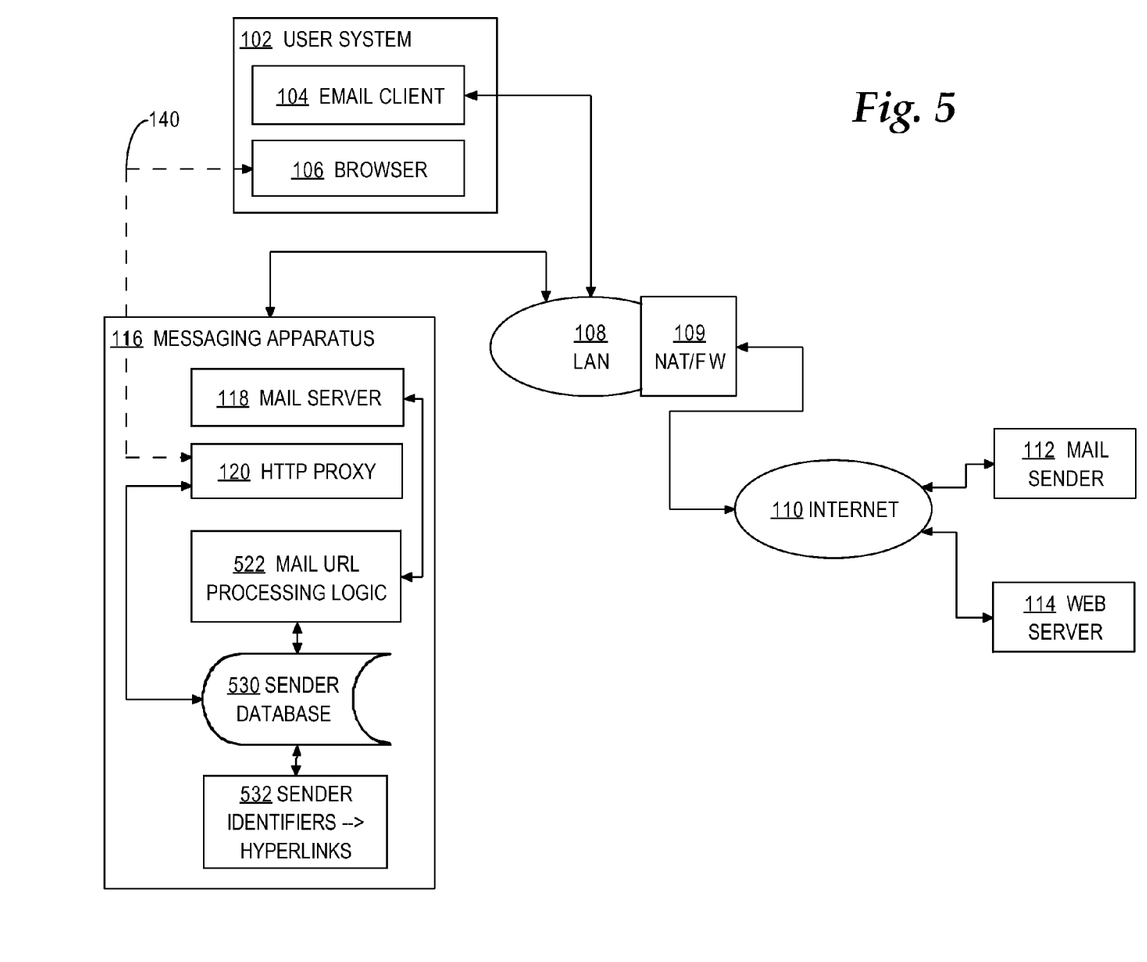
FIG. 5 is a block diagram that illustrates an example network arrangement that may be used to implement an embodiment.
Figure 6A:
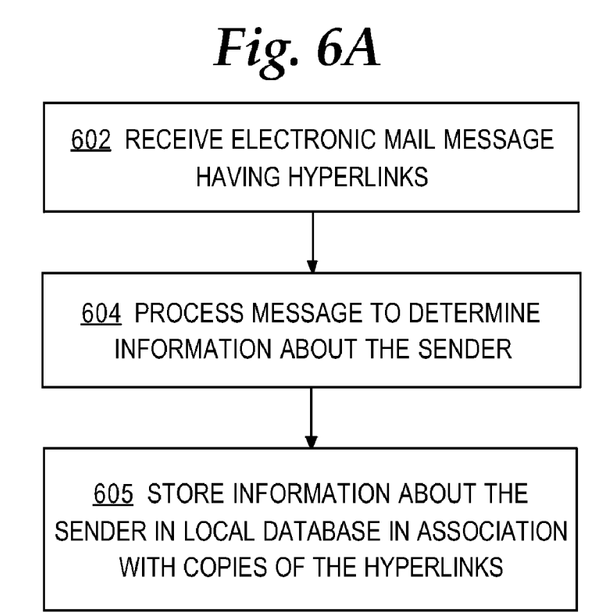
FIG. 6A, FIG. 6B, and FIG. 7 are flow diagrams that illustrate embodiments of a method for controlling access to network resources referenced in electronic mail messages.
Figure 6B:
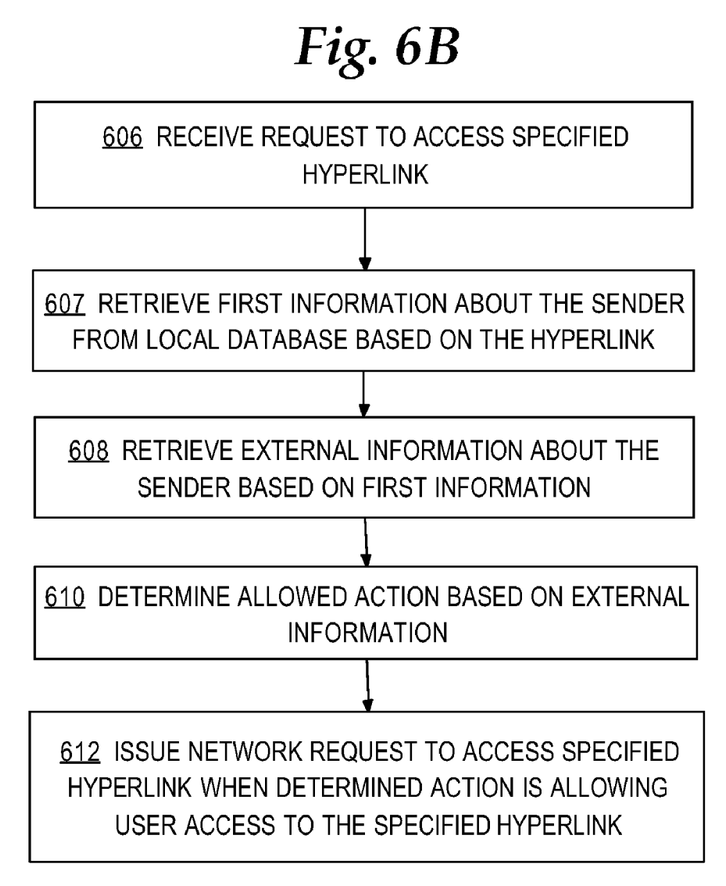
Figure 7:
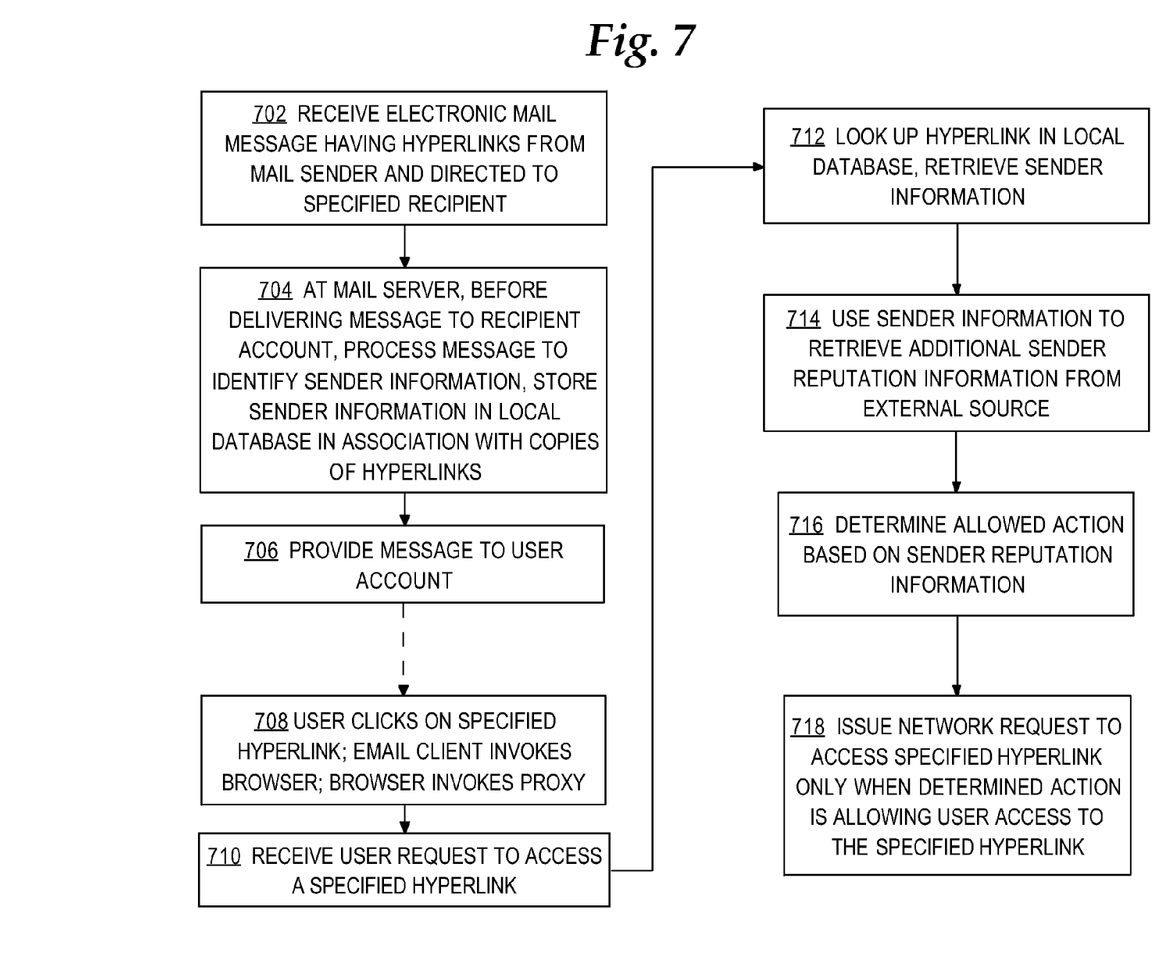

FIG. 5 is a block diagram that illustrates an example network arrangement that may be used to implement an embodiment. FIG. 6A, FIG. 6B, and FIG. 7 are flow diagrams that illustrate embodiments of a method for controlling access to network resources referenced in electronic mail messages. Referring first to FIG. 5, a user system 102 hosts an e-mail client 104 and a browser 106, and is coupled to a local area network (LAN) 108. E-mail client 104 is an HTML-enabled e-mail reading and sending program, for example, Microsoft Outlook 2003. Browser 106 can render HTML documents and communicate with network resources using HTTP. For example, browser 106 comprises Firefox, Netscape Navigator, Microsoft Internet Explorer, etc.

For purposes of illustrating a clear example, FIG. 5 illustrates LAN 108 coupled to one user system 102; however, in other embodiments any number of user systems is coupled to the LAN.

LAN 108 is coupled directly or indirectly through one or more internetworks, or Internet 110, to a mail sender 112 and a network resource such as Web server 114. Mail sender 112 generally represents any entity that sends e-mail messages directed to user system 102 or a user of the user system; the mail sender may be a legitimate end user, a legitimate bulk commercial mailing site, or a malicious party. Web server 114 holds one or more network resources such as Web sites, HTML documents, HTTP applications, etc. The Web server 114 may be owned, operated, or affiliated with mail sender 112, or may be independent.

A network address translation (NAT) or firewall device 109 may be deployed at an external edge of LAN 108 to control the flow of packets to or from the LAN.

A messaging apparatus 116 is coupled to LAN 108 and comprises in combination a mail server 118, HTTP proxy 120, mail URL processing logic 522, and local sender database 530. In one embodiment, mail server 118 comprises a simple mail transfer protocol (SMTP) mail transfer agent that can send e-mail messages through LAN 108 to other local users and through Internet 110 to remote users, and can receive messages from the LAN or Internet and perform message-processing functions.

HTTP proxy 120 implements HTTP and can send and receive HTTP requests and responses on behalf of user system 102 and other users systems that are coupled to LAN 108. In an embodiment, the browser 106 of user system 102 is configured to use an HTTP proxy rather than sending and receiving HTTP requests and responses directly, and is configured with a network address of HTTP proxy 120, as indicated by dashed line 130. Such configuration may be an explicit configuration, or HTTP proxy 120 may be configured as a transparent proxy. Thus, when a user of system 102 selects a hyperlink referring to Web server 114 and contained in an HTML document that browser 106 is displaying, the browser generates an HTTP request directed to HTTP proxy 120 rather than to Web server 114.

Mail URL processing logic 522 comprises one or more computer programs, methods, processes, or other software elements that implement the functions that are described further herein, such as the functions of FIG. 6A, FIG. 6B, and FIG. 7. All or part of mail URL processing logic 522 may be integrated in one or both of the mail server 118 and HTTP proxy 120, or may be implemented as a separate software element.

Local sender database 530 stores records of mappings 532 between information identifying message senders, such as mail sender 112, and hyperlinks that appear in messages received from the senders. The use of database 530 and mappings 532 is described further below.

In one embodiment, messaging apparatus 116 comprises any of the IronPort Messaging Gateway Appliances that are commercially available from IronPort Systems, Inc., San Bruno, Calif., configured with application software and/or operating system software that can perform the functions described herein.

FIG. 6A and FIG. 6B are flow diagrams that illustrate a high level overview of one embodiment of a method for controlling access to network resources referenced in electronic mail messages; FIG. 7 is a flow diagram that illustrates a more detailed view of another embodiment of a method for controlling access to network resources referenced in electronic mail messages. For purposes of illustrating a clear example, FIG. 6A, FIG. 6B, and FIG. 7 are now described with reference to the context of FIG. 5. However, the broad approach of FIG. 6A, FIG. 6B, and FIG. 7 may be implemented in many other contexts.

In step 602, an electronic mail message having hyperlinks is received. In this description, "hyperlink" and "URL" refer to any element of a message that describes a network resource or location. For example, mail sender 112 sends a message through Internet 110 directed to a user account on mail server 118 that is associated with a user of system 102. The messaging apparatus 116 receives the message at mail server 118, which buffers the message and signals the mail URL processing logic 522 that a new message has arrived. Assume, for purposes of illustrating a clear example, that the body of the received message contains the text shown in Table 1 above.

At step 604, the message is processed to determine information about the sender. For example, mail server 118 or mail URL processing logic 522 extracts from the message information about the sender such as IP address, "From" value, MID value, etc. In step 605, the sender information is stored in a local database in association with copies of the hyperlinks. In an embodiment, the hyperlinks are stored in keyed columns so that later lookup operations can use a hyperlink as a lookup key.

Referring now to FIG. 6B, in step 606, a request is received to access a specified hyperlink. For example, a user of system 102 activates email client 104, reads the received message copy, and clicks on the URL contained in the message. In response, email client 104 invokes browser 106, for example, using an API of the browser or a dynamic linked library (DLL) associated with the browser. When invoking the browser 106, email client 104 passes a copy of the selected URL to the browser.

Alternatively, step 606 is performed when a user of system 102 enters the same URL directly into the browser, or selects the URL from another site, network resource, or document. In other words, step 606 is not required to occur as a result of clicking a URL in an email; step 606 can involve any selection of a particular hyperlink. Thus, receiving a URL in an email earlier and storing information about the email sender can be used to control any subsequent request for that URL, whether or not the subsequent request occurs by selecting the URL from within the same email. Moreover, the request of step 606 may be received from a user who is different than the recipient of the email involved in steps 602, 604. Further, step 606 may occur immediately after the steps of FIG. 6A, or step 606 may occur at any time—seconds to years—thereafter.

Because the browser 106 has been configured to use HTTP proxy 120 for accessing URLs, the browser passes the URL to the proxy and requests the proxy to access the URL on behalf of the browser. Mail URL processing logic 522 receives the URL from the HTTP proxy 106. In effect, mail URL processing logic 522 intercepts the user's invocation of the URL, which allows the mail URL processing logic to examine the URL and determine whether to permit the user to access the URL. Alternatively, HTTP proxy 120 may comprise logic for implementing subsequent steps of FIG. 6B.

At step 607, the hyperlink is located in a local database, and first information about the sender is retrieved from the local database based on the hyperlink. The term "first" is used merely to distinguish the information retrieved at step 607 from other information described below for step 608. For example, HTTP proxy 120 retrieves a record from sender database 530 using the hyperlink or URL as a key. As a result, from table 532, HTTP proxy 120 receives a sender identifier that is associated with the URL.

At step 608, external information is retrieved about the sender based on the first information. For example, step 608 can comprise issuing a request to sender database 130 (FIG. 1) for a sender reputation score, based on the first information. Thus, HTTP proxy 120 or mail URL processing logic 522 can retrieve a sender IP address from sender database 530, and then perform a further lookup in sender database 130 (FIG. 1) for sender reputation information associated with that IP. Alternatively, step 608 may comprise performing a database retrieval operation in another form of database, based on the first information.

At step 610, based on the identifier value of the specified hyperlink, an allowed action is determined. For example, HTTP proxy 120 or mail URL processing logic 522 receives information from sender database 130 (FIG. 1) and determines whether to allow the user to access the URL based on the received information. Alternatively, if messaging apparatus is provided with sufficient storage and processing power, sender database 130 (FIG. 1) may be managed locally within the messaging apparatus 116 or integrated with sender database 530. Allowed actions may include accessing a URL, blocking access to a URL, blocking access to a URL and also issuing a warning message, allowing access to a URL conditionally, etc.

In one embodiment, if a URL is not found in sender database 530 at step 607, then access to the URL is allowed—in that case, the HTTP proxy 120 does not have access to information indicating any threat associated with the URL. Alternatively, if a URL is not found in sender database 530 at step 607, then HTTP proxy 120 can consult other information sources, such as a URL whitelist, URL blacklist, or other information about the trustworthiness or "reputation" of the Web site associated with the URL.

Messaging apparatus 116 may maintain database 530 for use with features, applications or functions other than mail URL processing logic 522. Further, database 530 may be maintained outside messaging apparatus 116, which may access the tables or database of sender information through LAN 108 or Internet 110.

In step 612, a network request to access a specified hyperlink is issued when the determined action is allowing user access to the specified hyperlink. For example, when mail URL processing logic 522 or HTTP proxy 120 determines at step 610 that the sender of the message has a good reputation or the URL has a good reputation, or that the user may access the requested URL, then HTTP proxy 120 issues an HTTP GET request for the requested URL. The HTTP GET request passes through LAN 108 and Internet 110 to a web server 114 associated with a domain specified in the URL, and the web server provides an HTTP response. Proxy 120 receives the HTTP response and forwards the response to browser 106, which acts upon the response. For example, the response may contain an HTML document, which browser 106 displays.

Referring now to FIG. 7, a more detailed view of the approach herein comprises receiving, at step 702, an electronic mail message having one or more hyperlinks, from a mail sender, and directed to a specified recipient. For example, mail server 118 receives an e-mail message that mail sender 112 has sent to a user account associated with a user of system 102. In step 704, at the mail server 118, before the message is delivered to a recipient account, the message is processed to identify information about the sender of the message, and the sender information is stored in a local database in association with copies of the hyperlinks. At step 706, the modified message is provided to the user account.

At any later time, in step 708, a user clicks on a particular hyperlink in the message. In an attempt to access the hyperlink and display or access a network resource associated with the hyperlink, email client 104 invokes browser 106, and the browser invokes HTTP proxy 120. The HTTP proxy 120 passes, to mail URL processing logic 522, the hyperlink specified in the browser invocation; thus, at step 710, a user request to access a specified hyperlink is received at the mail URL processing logic. Alternatively, step 708 is omitted, and step 710 occurs as a result of any user requesting a URL that was previously received in an email directed to that user or a different user.

In response, in step 712, the requested URL is looked up in a local database, such as sender database 530 (FIG. 5). Sender information is retrieved from the database, by using the requested URL as a key and retrieving a record that includes the sender information stored in association with the URL. In step 714, the sender information is used to retrieve additional sender reputation information from an external source. For example, if the sender information retrieved from database 530 is an IP address, a request using that IP address is formed and sent over networks 108, 110 to an external source, such as sender database 130 (FIG. 1), or the Senderbase® service of IronPort. In response, a reputation score value associated with the IP address is received.

At step 716, an allowed action is determined for the URL, based on the information about the sender obtained from the external sender information base 130 (FIG. 1). At step 718, if the action determined at step 716 is allowing user access to the specified hyperlink, then the mail URL processing logic 522 instructs or allows the HTTP proxy 120 to issue a network request to access the specified hyperlink The approach herein uniquely ties together SMTP mail information and HTTP information, which are normally unrelated. The approach can relate information about a sender of an incoming email to a corresponding URL in an HTTP request that arrives at a later time through a different server. Because the messaging apparatus and approach herein controls both an incoming mail stream using an SMTP server and an HTTP stream using an HTTP proxy, the system can determine the origin of a message and determine whether to allow HTTP access to URLs originally received in messages, based on the origin or sender of the message.

The incoming mail server can store sender information in association with URLs in incoming messages, so that when a user clicks on a URL in an email, enters the URL in a browser, or selects the URL in any other web site or document, the HTTP proxy can determine reputation information associated with the URL, and determine whether to allow access to the URL. As a result, computer users are protected against threats in malicious web sites accessed through URLs that are distributed in emails. The approach provides the messaging apparatus with a second chance to stop threats associated with URLs and distributed in email messages.

The approach herein also is useful in processing URLs that specify protocols other than HTTP. For example, the approach herein is useful for URLs that specify HTTP over TLS or SSL (HTTPS://URLs) if HTTP proxy 120 (FIG. 1) is configured to terminate a TLS connection or SSL connection to web server 114. The approach herein also is useful for other protocols that can be explicitly or transparently proxied.

3.0 Implementation Mechanisms—Hardware Overview

Figure 4:
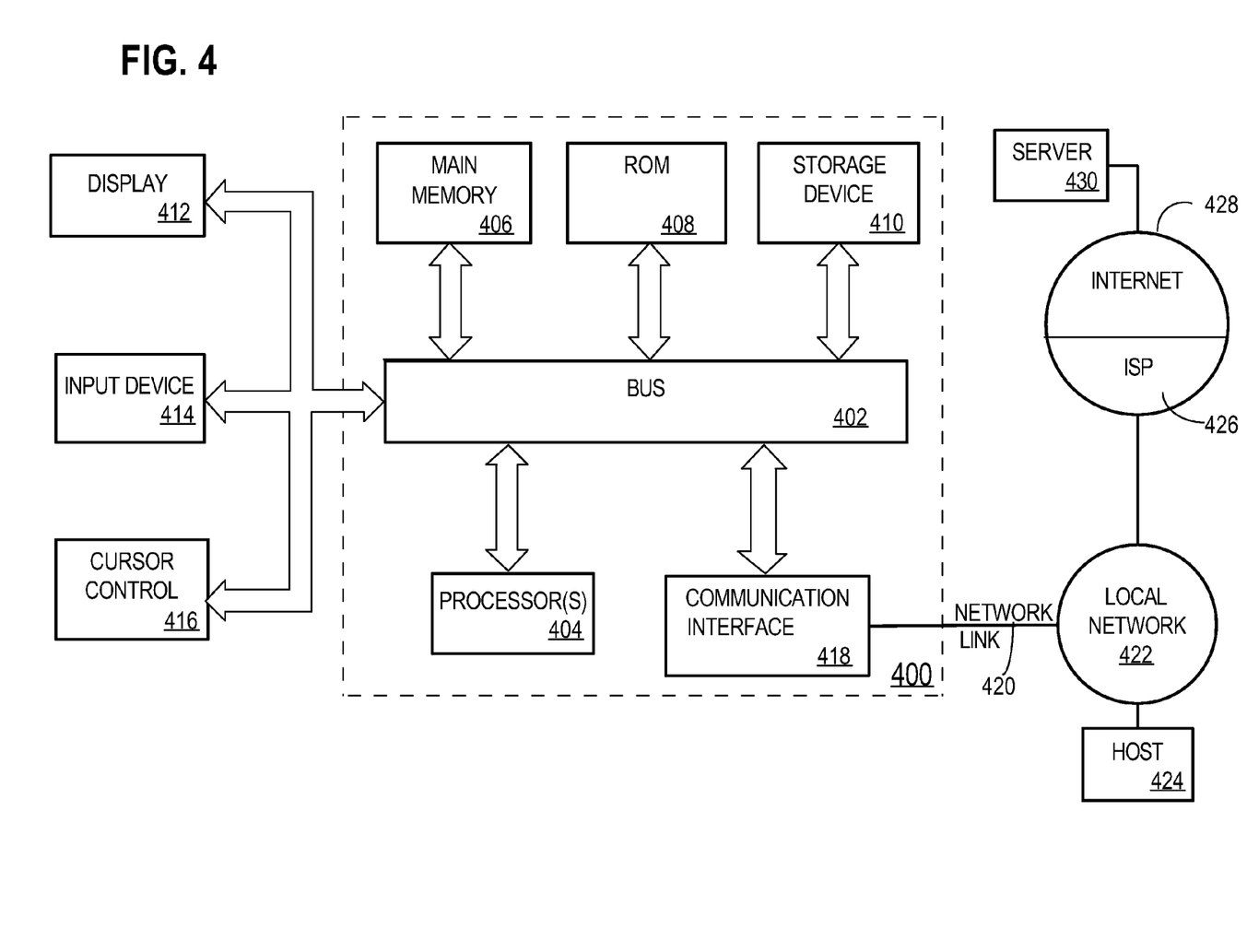
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and one or more processors (represented by processor 404) coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for controlling access to network resources referenced in electronic mail messages. According to one embodiment of the invention, controlling access to network resources referenced in electronic mail messages is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for controlling access to network resources referenced in electronic mail messages as described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the computer-implemented steps of:
   receiving an electronic mail message that comprises one or more hyperlinks;
   determining sender information that identifies a sender of the electronic mail message;
   creating and storing a record that associates the sender information with each of the one or more hyperlinks;
   receiving a request to access a specified hyperlink among the one or more hyperlinks;
   retrieving, based on the specified hyperlink, the record;
   retrieving, based on the sender information associated with the specified hyperlink, sender reputation information associated with the sender;
   determining, based on the sender reputation information, a particular action among a plurality of allowed actions;
   issuing a network request to access the specified hyperlink only when the particular action is allowing user access to the specified hyperlink.

2. A method as recited in claim 1, wherein the plurality of allowed actions include blocking user access to the specified hyperlink.

3. A method as recited in claim 1, wherein the record is stored in a local database in a messaging apparatus that comprises an SMTP mail transfer agent and an HTTP proxy.

4. A method as recited in claim 1, wherein the request to access the specified hyperlink is received at an HTTP proxy, and wherein the electronic mail message is received at an SMTP mail transfer agent that is coupled to the HTTP proxy.

5. A method as recited in claim 1, wherein the sender information comprises a network address of a sender of the electronic mail message.

6. A method as recited in claim 1, wherein the sender information comprises a message header "From:" value that is extracted from the electronic mail message.

7. A method as recited in claim 1, wherein the sender reputation information is retrieved by providing the sender information in a request to an external sender reputation database.

8. A data processing apparatus, comprising:
one or more processors;
an HTTP proxy server hosted on one or more of the one or more processors;
an SMTP mail transfer agent that is coupled to the HTTP proxy server;
electronic mail processing logic that comprises one or more sequences of instructions which, when executed by the one or more processors, cause the one or more processors to perform the steps of:
receiving an electronic mail message that comprises one or more hyperlinks;
determining sender information that identifies a sender of the electronic mail message;
creating and storing a record that associates the sender information with each of the one or more hyperlinks;
receiving a request to access a specified hyperlink among the one or more hyperlinks;
retrieving, based on the specified hyperlink, the record;
retrieving, based on the sender information associated with the specified hyperlink, sender reputation information associated with the sender;
determining, based on the sender reputation information, a particular action among a plurality of allowed actions;
issuing a network request to access the specified hyperlink only when the particular action is allowing user access to the specified hyperlink.

9. An apparatus as recited in claim 8, wherein the plurality of allowed actions include blocking user access to the specified hyperlink.

10. An apparatus as recited in claim 8, wherein the record is stored in a local database in a messaging apparatus that comprises an SMTP mail transfer agent and an HTTP proxy.

11. An apparatus as recited in claim 8, wherein the request to access the specified hyperlink is received at an HTTP proxy, and wherein the electronic mail message is received at an SMTP mail transfer agent that is coupled to the HTTP proxy.

12. An apparatus as recited in claim 8, wherein the sender information comprises a network address of a sender of the electronic mail message.

13. An apparatus as recited in claim 8, wherein the sender information comprises a message header "From:" value that is extracted from the electronic mail message.

14. An apparatus as recited in claim 8, wherein the sender reputation information is retrieved by providing the sender information in a request to an external sender reputation database.

15. A message processing system, comprising:
a sender reputation database that associates information identifying senders of electronic mail messages with reputation score values for the senders;
one or more messaging devices coupled to the sender reputation database through one or more networks, wherein each of the messaging devices comprises:
one or more processors;
an HTTP proxy server hosted on one or more of the one or more processors;
an SMTP mail transfer agent that is coupled to the HTTP proxy server;
a local database that stores records that associate message sender identifying information with copies of URLs received in electronic mail messages from the senders;
electronic mail processing logic that comprises one or more sequences of instructions which, when executed by the one or more processors, cause the one or more processors to perform the steps of:
receiving an electronic mail message that comprises one or more hyperlinks;
determining sender information that identifies a particular sender of the electronic mail message;
creating and storing a record in the local database that associates the sender information with each of the one or more hyperlinks;
receiving a request to access a specified hyperlink among the one or more hyperlinks;
retrieving, based on the specified hyperlink, the record;
retrieving, from the sender reputation database based on the sender information associated with the specified hyperlink, sender reputation information associated with the sender;
determining, based on the sender reputation information, a particular action among a plurality of allowed actions;
issuing a network request to access the specified hyperlink only when the particular action is allowing user access to the specified hyperlink.

16. A system as recited in claim 15, wherein the plurality of allowed actions include blocking user access to the specified hyperlink.

17. A system as recited in claim 15, wherein the record is stored in a local database in a messaging apparatus that comprises an SMTP mail transfer agent and an HTTP proxy.

18. A system as recited in claim 15, wherein the request to access the specified hyperlink is received at an HTTP proxy, and wherein the electronic mail message is received at an SMTP mail transfer agent that is coupled to the HTTP proxy.

19. A system as recited in claim 15, wherein the sender information comprises a network address of a sender of the electronic mail message.

20. A system as recited in claim 15, wherein the sender information comprises a message header "From:" value that is extracted from the electronic mail message.

21. A system as recited in claim 15, wherein the sender reputation information is retrieved by providing the sender information in a request to an external sender reputation database.

* * * * *